United States Patent
Furuhata et al.

(10) Patent No.: US 8,348,282 B2
(45) Date of Patent: Jan. 8, 2013

(54) TOOL CLAMPING DEVICE AND TOOL CLAMPING METHOD

(75) Inventors: Tetsuro Furuhata, Nagoya (JP); Yuichi Miura, Kariya (JP)

(73) Assignee: JTEKT Corporation, Osaka-shi (JP)

( * ) Notice: Subject to any disclaimer, the term of this patent is extended or adjusted under 35 U.S.C. 154(b) by 765 days.

(21) Appl. No.: 12/477,557

(22) Filed: Jun. 3, 2009

(65) Prior Publication Data

US 2009/0304474 A1 Dec. 10, 2009

(30) Foreign Application Priority Data

Jun. 4, 2008 (JP) ................................. 2008-147362

(51) Int. Cl.
*B23B 31/103* (2006.01)
(52) U.S. Cl. ...................................... 279/2.11; 409/231
(58) Field of Classification Search ................ 409/231, 409/233, 234; 279/2.11, 2.12
See application file for complete search history.

(56) References Cited

U.S. PATENT DOCUMENTS

| | | | | |
|---|---|---|---|---|
| 4,621,960 A | * | 11/1986 | Tollner | 409/232 |
| 5,509,763 A | * | 4/1996 | Reinauer et al. | 409/233 |
| 2005/0175425 A1 | * | 8/2005 | Watanabe et al. | 409/233 |
| 2007/0110534 A1 | | 5/2007 | Erickson | |

FOREIGN PATENT DOCUMENTS

| | | | |
|---|---|---|---|
| DE | 34 36 733 A1 | | 4/1986 |
| DE | 35 04 905 A1 | | 8/1986 |
| DE | 3912503 A1 | * | 3/1990 |
| DE | 3834192 A1 | * | 4/1990 |
| JP | 1-175105 | | 12/1989 |
| JP | 11-129105 | | 5/1999 |
| JP | 2000-24812 | | 1/2000 |
| JP | 2005279875 A | * | 10/2005 |
| JP | 2005-313311 | | 11/2005 |

OTHER PUBLICATIONS

Google Translate. Machine Translation [online]. Google [retrieved on Apr. 12, 2012].*
Extended European Search Report issued on Sep. 19, 2012 in EP 09161798.5.
Japanese Office Action (2008-147362) dated Oct. 2, 2012 (Partial Translation).

* cited by examiner

*Primary Examiner* — Daniel Howell
*Assistant Examiner* — Justin Sikorski
(74) *Attorney, Agent, or Firm* — Oblon, Spivak, McClelland, Maier & Neustadt, L.L.P.

(57) ABSTRACT

A tool clamping device includes: a tool holder having a two-face restraint portion constituted by a tool taper portion and a tool end surface; a spindle having a spindle taper portion facing the tool taper portion and a spindle end surface facing the tool end surface, wherein the tool holder is clamped to the spindle by performing an operation to pull the tool holder in toward the spindle; and a clamping unit housed in the spindle, wherein, when the tool end surface is in contact with the spindle end surface and the tool taper portion is fitted into the spindle taper portion, a gap is formed between the tool taper portion and the spindle taper portion.

11 Claims, 8 Drawing Sheets

TOOL CLAMPING DEVICE AND TOOL CLAMPING METHOD

INCORPORATION BY REFERENCE

The disclosure of Japanese Patent Application No. 2008-147362 filed on Jun. 4, 2008 including the specification, drawings and abstract is incorporated herein by reference in its entirety.

BACKGROUND OF THE INVENTION

1. Field of the Invention

The invention relates to a tool clamping device and a tool clamping method.

2. Description of the Related Art

At present, a two-face restraint clamping system for a hollow tapered tool, such as an HSK system conforming to Japanese Industrial Standards (JIS) or a KM system conforming to manufacturer standards, for example, is available as a tool clamping system for an automatically exchangeable tool exhibiting a high degree of repeat attachment precision.

According to a tool clamping device described in Japanese Patent Application Publication No. 2005-313311 (JP-A-2005-313311), a clamping mechanism for clamping a pull stud portion formed on a taper shank portion of a tool holder is housed in the interior of a unit main body, and a draw bar connected to a slider for open/close operating a clamping member of the clamping mechanism is caused to project to the outside from a rear end portion of the unit main body. A belleville spring is mounted on an outer periphery of the draw bar so as to be positioned between a spring receiving member and a spring receiving member, and thus the draw bar is normally biased in a rearward clamping direction. In this clamped state, a spindle restrains the taper shank and an end surface of the tool holder, thereby realizing so-called two-face restraint clamping.

However, a clamping mechanism of an HSK system or another two-face restraint clamping system for a hollow tapered tool, which is used in the tool clamping device described above, is shaped to provide a tool taper portion with a tightening margin, and therefore, when a pull-in force (clamping force) is caused to act, the hollow taper portion of the tool itself and a partner spindle taper portion are deformed by an amount corresponding to the tightening margin, whereby positioning is performed in a centering direction while keeping the tapered surfaces in close contact. From this state, end surfaces are pulled into close contact through deformation corresponding to the tightening margin, whereby positioning is performed in an inclination direction. The clamping operation is thus complete. In other words, centering direction positioning and inclination direction positioning are performed simultaneously mainly using only an axial direction pull-in force. As a result, the centering precision, which contributes greatly to tapered surface positioning in a geometrical sense, is favorable, but the inclination precision, which contributes greatly to end surface positioning, is poorer than the centering precision, leading to variation in the precision of repeat tool attachment.

SUMMARY OF THE INVENTION

An object of the invention is to provide a tool clamping device and a tool clamping method exhibiting superior tool inclination precision, tool centering precision and repeat tool attachment precision.

A tool clamping device according to an aspect of the invention includes: a tool holder having a two-face restraint portion constituted by a tool taper portion and a tool end surface; a spindle having a spindle taper portion facing the tool taper portion and a spindle end surface facing the tool end surface, wherein the tool holder is clamped to the spindle by performing an operation to pull the tool holder in toward the spindle; and a clamping unit housed in the spindle, wherein, when the tool end surface is in contact with the spindle end surface and the tool taper portion is fitted into the spindle taper portion, a gap is formed between the tool taper portion and the spindle taper portion.

In the tool clamping device according to the aspect described above, when a pull-in operation performed by the clamping unit begins, a gap may be formed between the tool taper portion and the spindle taper portion, and when the pull-in operation ends, the tool taper portion and the spindle taper portion may contact each other closely.

Further, in the tool clamping device according to the aspect described above, the tool holder may include a taper shank portion that is in a hollow shape, and the tool taper portion may be an outer peripheral surface of the taper shank portion.

Further, in the tool clamping device according to the aspect described above, the taper shank portion may include a clamping force acting portion that receives a radially outward clamping force generated during the pull-in operation performed by the clamping unit.

Further, in the tool clamping device according to the aspect described above, the clamping force acting portion may be an inclined surface for converting the clamping force into components in both an outward radial direction of the spindle and a direction, of an axial direction of the spindle, in which the tool end surface and the spindle end surface come into close contact.

A tool clamping method according to an aspect of the invention includes: a pull-in start process in which a tool holder having a two-face restraint portion constituted by a tool taper portion and a tool end surface is caused to face a spindle having a spindle taper portion facing the tool taper portion and a spindle end surface facing the tool end surface such that the tool end surface and the spindle end surface are brought into contact with each other; and a pull-in operation process performed after the pull-in start process to increase a diameter of the tool taper portion such that the tool taper portion is brought into close contact with the spindle taper portion.

In the pull-in start process of the tool clamping method according to the aspect described above, a gap may be formed between the tool taper portion and the spindle taper portion.

Further, in the pull-in operation process, the diameter of the tool taper portion may be increased such that the tool taper portion is brought into close contact with the spindle taper portion, and by increasing the diameter of the tool taper portion, the tool taper portion may be brought into close contact with the spindle taper portion.

According to the above aspects of the invention, a tool clamping device and a tool clamping method exhibiting superior tool inclination precision, tool centering precision and repeat tool attachment precision can be provided.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

First Embodiment of the Invention

Figure 1:
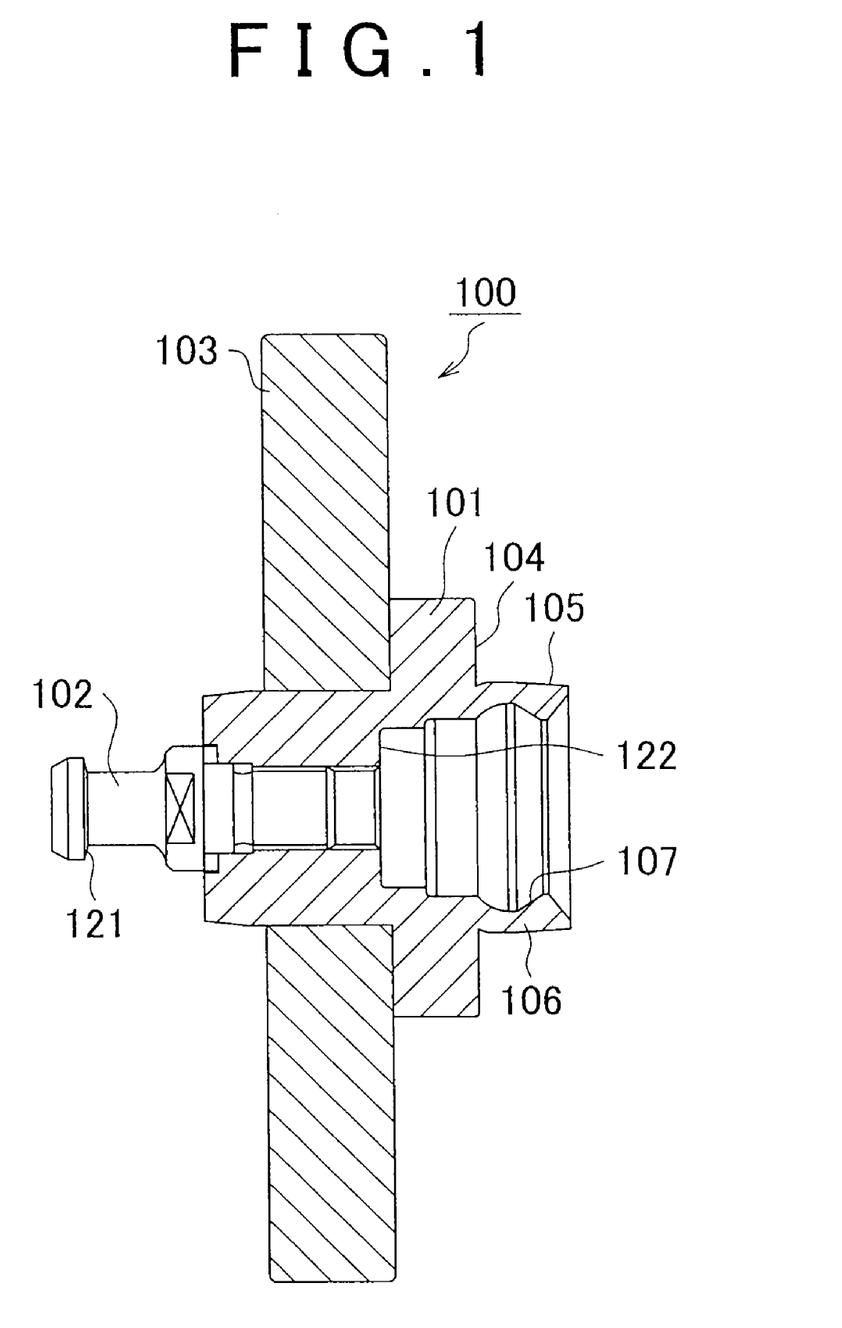
FIG. 1 shows the structure of a tool according to a first embodiment of the invention.
Figure 2:
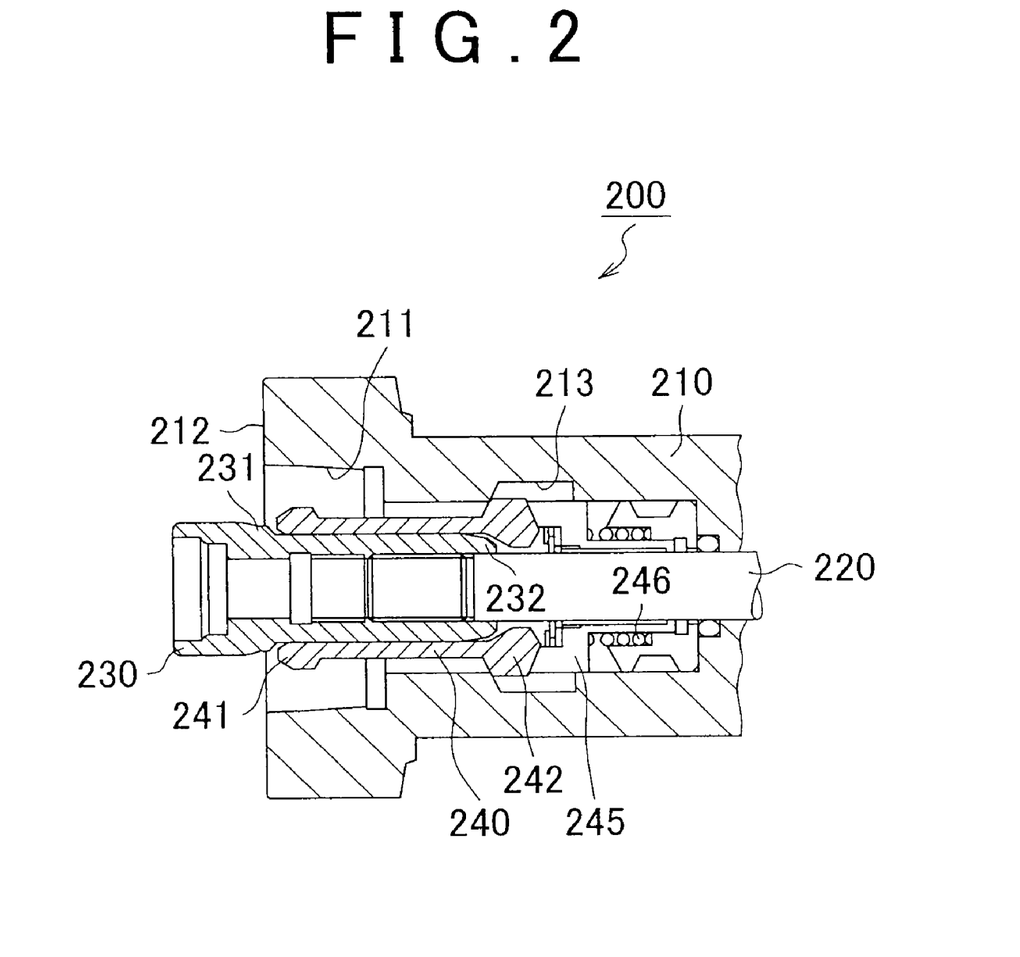
FIG. 2 is a longitudinal sectional view showing the constitution of a spindle unit 200 in an unclamped state.
Figure 3:
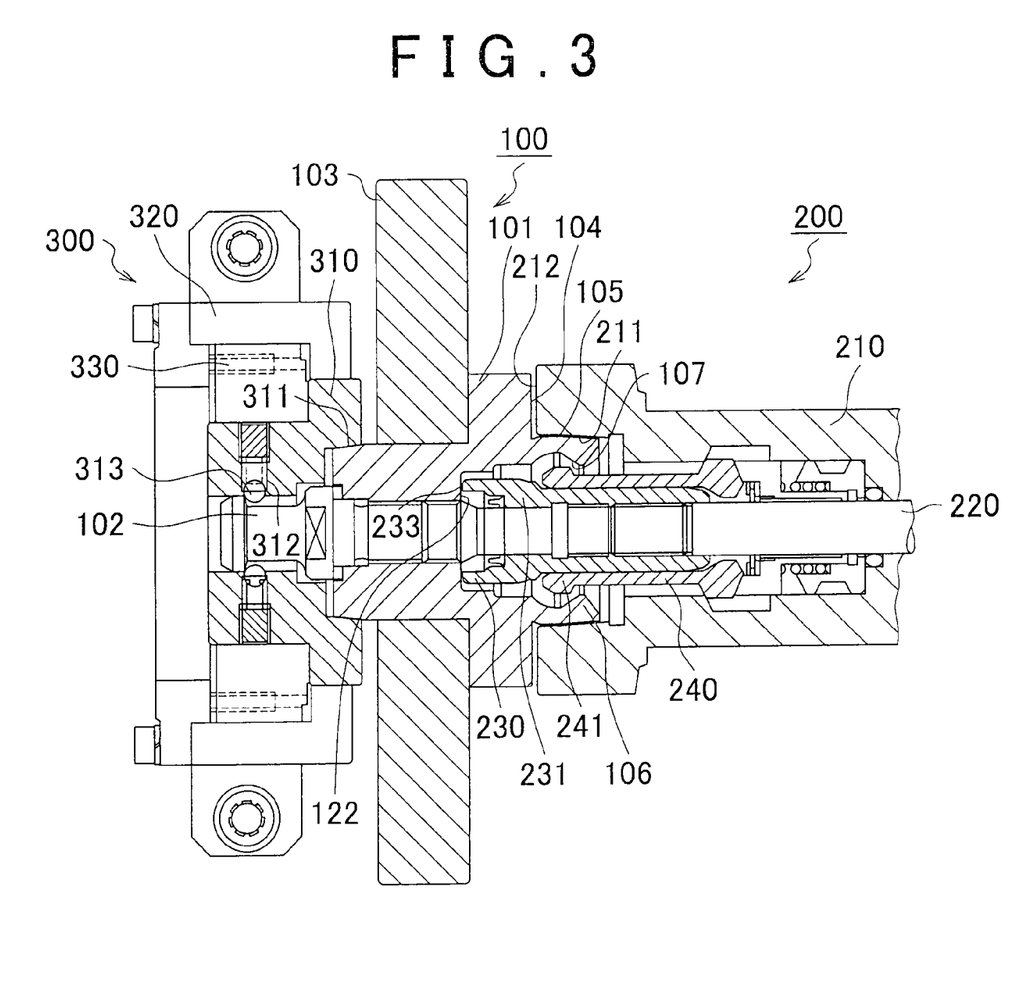
FIG. 3 is a longitudinal sectional view showing a state in which a tool 100, the spindle unit 200, and a tool retainer 300 are disposed in an unclamped state.
Figure 4:
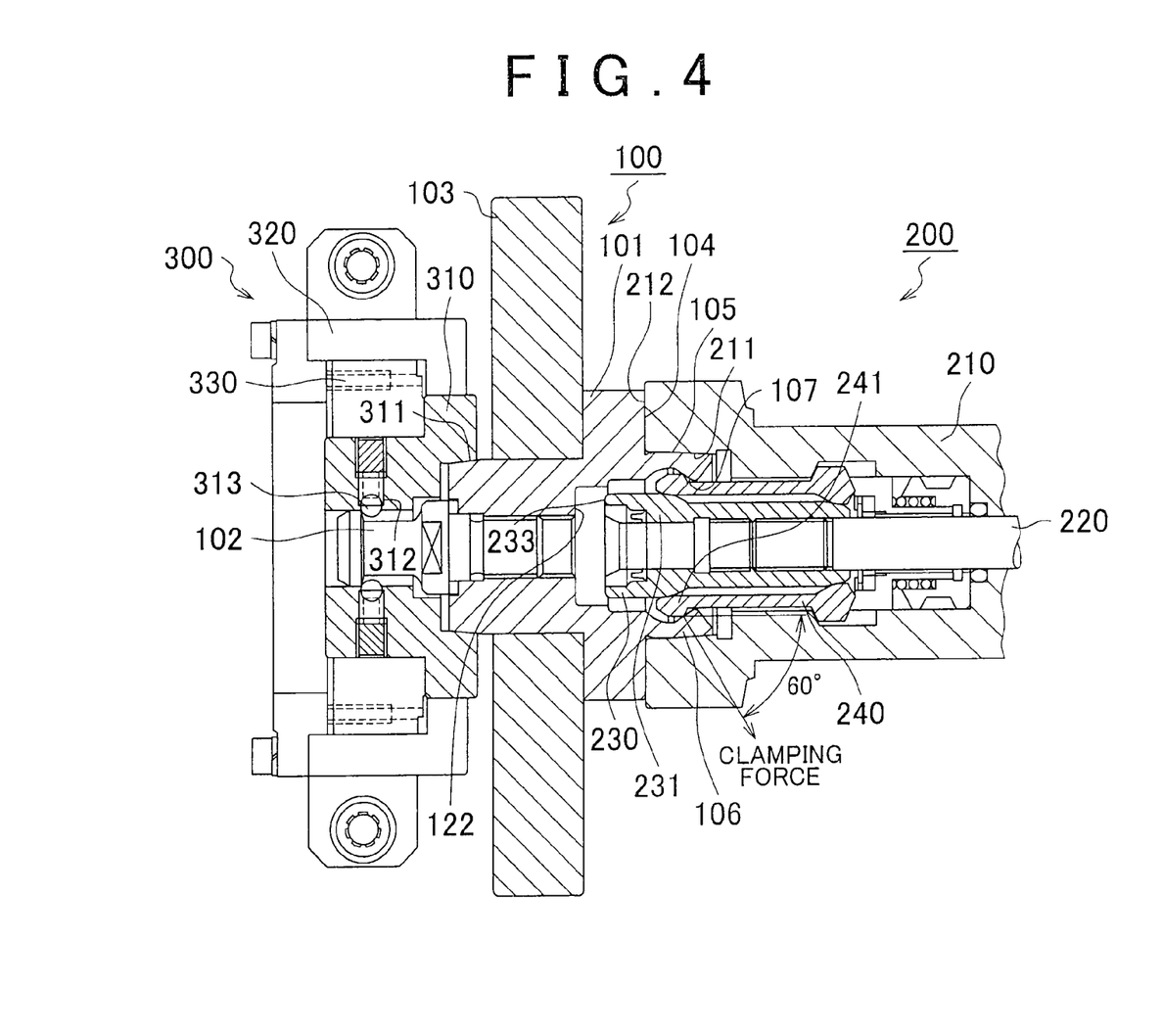
FIG. 4 is a longitudinal sectional view showing a state in which the tool 100, spindle unit 200, and tool retainer 300 are disposed in a clamped state.

FIG. 1 shows the structure of a tool according to a first embodiment of the invention. FIG. 2 is a longitudinal sectional view showing the constitution of a spindle unit 200 in an unclamped state. FIG. 3 is a longitudinal sectional view showing a state in which a tool 100, the spindle unit 200, and a tool retainer 300 are disposed in an unclamped state. FIG. 4 is a longitudinal sectional view showing a state in which the tool 100, spindle unit 200, and tool retainer 300 are disposed in a clamped state.

(Tool 100) The tool 100 is mainly constituted by a tool holder 101, a pull stud bolt 102, and a tool main body portion 103.

The tool holder 101 takes the form of a hollow stepped flange, and the tool main body portion 103, which is constituted by a grinding wheel, a cutting tool, or similar, is attached and fixed thereto integrally. The pull stud bolt 102 is screwed to a central part of the tool holder 101 such that a latch portion 121 of the pull stud bolt 102 projects in an upright fashion from a tool retainer 300 side, to be described below. A tool end surface 104 and a tool taper surface 105 for positioning and fitting together the tool holder 101 and a spindle 210 are formed on an opposite side of the tool holder 101 to the side on which the pull stud bolt 102 stands upright. Further, an inner end surface 122 on which the tool holder 101 is pushed toward the tool retainer 300 by a spindle unit 200 to be described below is formed in a hollow portion of the tool holder 101.

The tool end surface 104 is perpendicular to a rotary axis of the tool 100, and serves as a reference surface defining an inclination precision when the tool 100 is clamped.

Meanwhile, the tool taper portion 105 is a tapered surface that is inclined from the rotary axis of the tool 100 by a predetermined angle (a 1/10 taper, for example), and serves as a reference surface defining a centering precision when the tool 100 is clamped. The tool taper portion 105 forms an outer peripheral surface of a taper shank portion 106 having a predetermined thickness, and a clamping force acting portion 107 for receiving a clamping force from the spindle unit 200 is formed on an inner peripheral surface of the taper shank portion 106. The clamping force acting portion 107 is formed with an inclined surface so as to increase the diameter of the taper shank portion 106 when a clamping wing 240 to be described below opens outward in a radial direction and generate a clamping force in a direction for pulling the tool holder 101 (the tool 100) inward toward the spindle 210.

(Spindle unit 200) The spindle unit 200 is mainly constituted by the spindle 210, a draw bar 220, a cone 230, and the clamping wing 240. The spindle unit 200 is driven to rotate by a rotary driving device such as a motor or an air spindle, not shown in the drawings.

A spindle taper portion 211 that engages with the tool taper portion 105 of the tool holder 101 is formed on a tip end outer peripheral portion of the spindle 210, and a spindle end surface 212 that contacts the tool end surface 104 of the tool holder 101 is formed on a tip end portion of the spindle 210 perpendicular to an axis thereof. The cylindrical cone 230 is disposed in a hollow portion of the spindle 210 and connected to the draw bar 220 so as to be capable of moving in the axial direction of the spindle 210 integrally therewith.

A plurality of the clamping wings 240 are disposed in contact with an outer peripheral surface of the cone 230. A tip end portion 241 of the clamping wing 240 contacts a step portion 231 formed on the outer peripheral surface of the cone 230 such that when the cone 230 moves, the step portion 231 can push the respective clamping wings 240 outward in the radial direction. Further, the tip end portion 241 of the clamping wing 240 is disposed such that an outer peripheral portion thereof is positioned opposite the clamping force acting portion 107, and therefore, in the clamped state, the clamping force acts on the clamping force acting portion 107.

Meanwhile, a rear end portion 242 of the clamping wing 240 is housed in a groove portion 213 provided in the hollow portion of the spindle 210 so that even when the cone 230 moves, the axial direction position thereof is substantially maintained, and in the clamped state, the rear end portion 242 is pushed by a rear end portion 232 of the cone 230 so as to move toward the groove portion 213, enabling the clamping wing 240 to move outward in the radial direction.

A spring holding member 245 and a spring 246 are disposed in a rear portion of the hollow portion of the spindle 210, and the clamping wing 240 is biased toward the tool 100 by the spring 246. Hence, in the clamped state, the clamping wing 240 is pushed outward in the radial direction with stability by the movement of the draw bar 220 and the cone 230.

(Tool retainer 300) A joining portion 310 is used to hold the tool holder 101 and perform a clamping operation or an unclamping operation in cooperation therewith when the tool 100 is replaced with another tool. A taper portion 311 for positioning the tool holder 101 and receiving an axial direction pushing force is formed on an open end of the joining portion 310, and a hole portion 312 having a smaller diameter than the open end of the joining portion 310 is formed in the rear of the taper portion 311. The size of the hole portion 312 is set such that the pull stud bolt 102 of the tool holder 101 can be fitted therein with a predetermined gap, and a click portion 313 is provided around the hole portion 312. The click portion 313 is engaged with the latch portion 121 formed on the pull stud bolt 102 of the tool holder 101 by a predetermined clicking force in order to hold the tool 100.

The joining portion 310 is carried on a base portion 320 fixed to a bed side of a machine tool and held in the axial direction via an axial force generating portion 330. A coil spring or a cylinder device driven by oil pressure, air pressure, or the like may be used as the axial force generating portion 330.

(Unclamped state) As shown in FIG. 2, in the unclamped state, the draw bar 220 is moved to the tool 100 side and the cone 230 is moved to the tool 100 side together with the draw bar 220. Therefore, the tip end portion 241 of the clamping wing 240 does not ride onto the step portion 231 and the clamping wing 240 remains closed.

As shown in FIG. 3, when the draw bar 220 is in the unclamped position, first, the tool retainer 300 and the spindle 210 are caused to approach and face each other by moving one of them, whereby the inner end surface 122 of the tool holder 101 is pushed toward the tool retainer 300 by the cone tip end portion 233. The pull stud bolt 102 is then latched by the click portion 313 of the tool retainer 300 such that the tool 100 is held by the tool retainer 300 in a state where the tool holder 101 is positioned through contact with the taper portion 311. In this state, a gap exists between the tool end surface 104 and the spindle end surface 212.

(Clamping operation) The tool 100 is pushed toward the tool retainer 300 by the cone tip end portion 233, whereby at least a predetermined amount of pushing force for pushing the tool 100 toward the spindle 210 side is generated as a reaction force from the axial force generation portion 330. Next, the draw bar 220 is withdrawn by hydraulic control or the like to a position in which the tool end surface 104 and the spindle end surface 212 come into close contact. Thus, a predetermined amount of pushing force is caused to act, thereby realizing end surface positioning and achieving inclination precision (a pull-in start step). When this pull-in start step is complete, the tool end surface 104 and the spindle end surface 212 are in close contact but a gap exists between the tool taper portion 105 and the spindle taper portion 211, and therefore a loose fit of $\phi 0.001$ to $\phi 0.006$ mm, for example, is achieved.

Following the pull-in start step, the draw bar 220 is withdrawn further by the pull-in force, and at the same time, the clamping wing 240, which has been pushed out along the step portion 231 of the cone 230, comes into contact with the clamping force acting portion 107. The taper shank portion 106 is increased in diameter by a radial component force (radially outward jutting force) of the clamping force generated by this contact. Thus, the tool taper portion 105 is deformed so as to come into close contact with the spindle taper portion 211, whereby tapered surface positioning is realized and centering precision is achieved. Further, a predetermined amount of end surface contact force is generated by an axial direction component force of the clamping force, thereby increasing the close contact between the tool end surface 104 and the spindle end surface 212 (a pull-in operation step). When the pull-in operation step is complete, the state shown in FIG. 4 is realized. As shown in FIG. 4, a contact relationship between the clamping force acting portion 107 and the tip end portion 241 is formed such that the clamping force acts in a substantially 60° direction from the axis, for example. In this case, approximately 0.85 (=sin 60°) of the clamping force acts in the diameter increasing direction and approximately 0.5 (=cos 60°) acts in the axial direction.

By performing the pull-in start step and the pull-in operation step described above, a clamping operation for clamping the tool 100 to the spindle 210 through two-face restraint can be realized. Note that once the clamping operation is complete, the tool 100 is removed from the tool retainer 300 against the clicking force of the click portion 313 so that a processing operation can be performed.

(Unclamping operation) An unclamping operation is performed by reversing the clamping operation described above. More specifically, the spindle 210 clamping the tool 100 is caused to approach the tool retainer 300 such that the pull stud bolt 102 of the tool holder 101 is latched to the click portion 313 of the tool retainer 300. In this state, the draw bar 220 and cone 230 are moved toward the tool 100 side such that the clamping wing 240, which is pushed outward in the radial direction by the step portion 231 of the cone 230, is closed inward in the radial direction. As a result, the clamping force applied to the clamping force acting portion 107 of the tool holder 101 by the clamping wing 240 is released. Then, when the spindle 210 (the spindle unit 200) is removed from the tool retainer 300, the tool 100 remains held by the tool retainer 300, enabling an operation to replace the tool 100 with another tool or the like.

Effects of the First Embodiment of the Invention (1) According to the first embodiment of the invention, inclination precision is achieved in the tool 100 by the pull-in start step, whereupon centering is performed in the pull-in operation step by expanding the taper shank portion 106 outward in the radial direction using the clamping wing 240. Thus, a clamping operation is performed. Hence, a stable two-face restraint exhibiting both superior inclination precision and superior centering precision can be realized during tool replacement. (2) By employing the clamping system (tool clamping device or tool clamping method) described above in automatic tool replacement, the number of truing operations required during each tool replacement can be reduced, enabling a reduction in the truing time (cycle time) and an improvement in the lifespan of the tool. (3) As a result of the contact between the clamping force acting portion 107 of the tool holder 101 and the tip end portion 241 of the clamping wing 240, the clamping force acts in a clamping angle 60° direction, as shown in FIG. 4, and therefore, in comparison with a standard HSK system having a clamping angle of 30°, for example, a superior tool gripping characteristic can be realized and the repeat tool attachment precision can be improved.

Second Embodiment of the Invention

Figure 5:
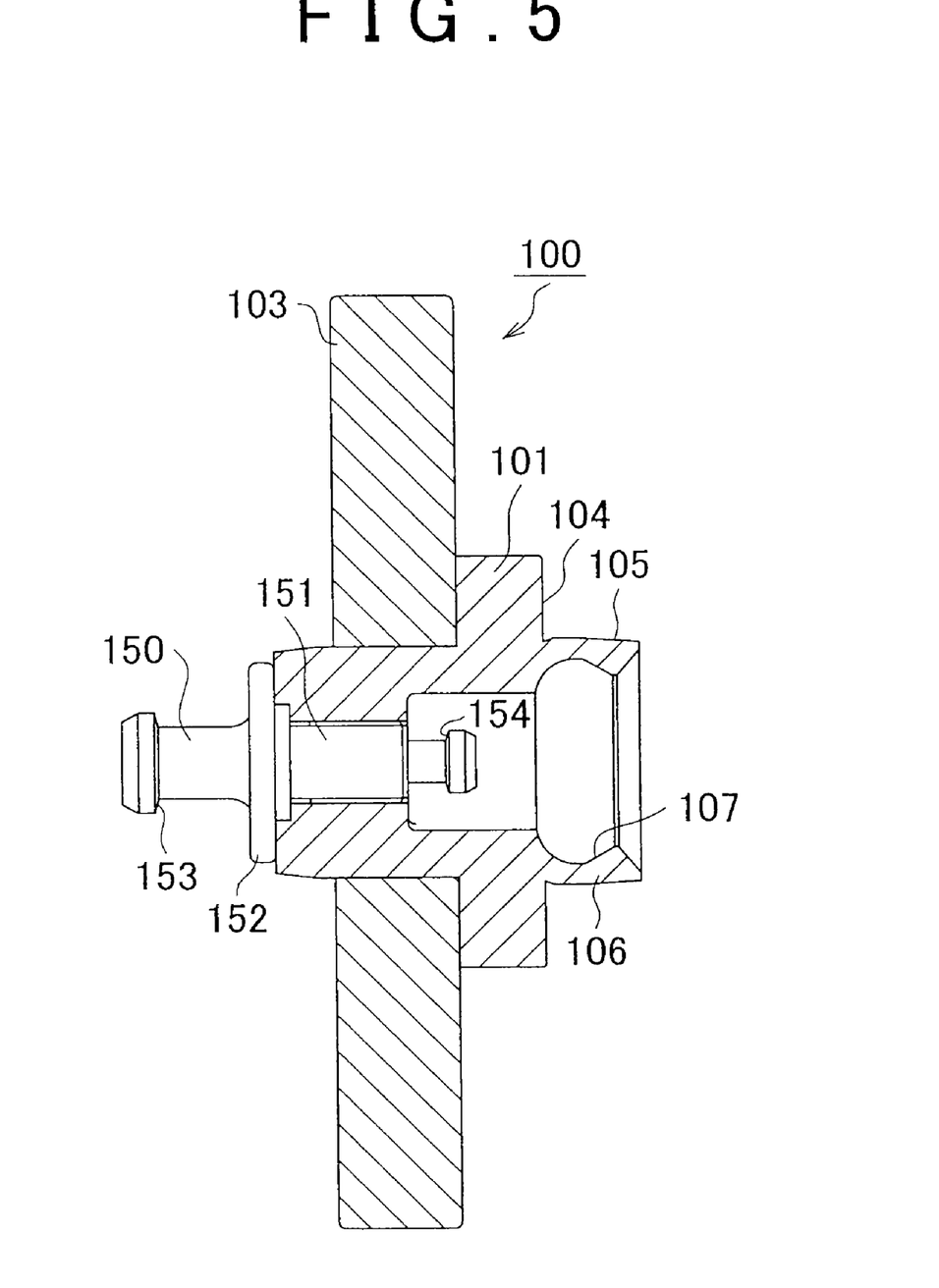
FIG. 5 shows the structure of a tool according to a second embodiment of the invention.
Figure 6:
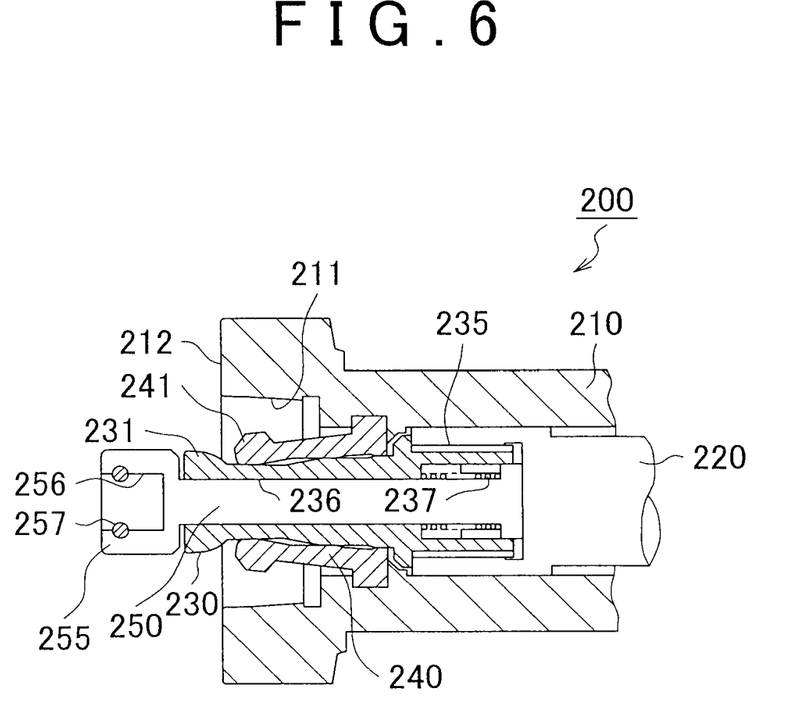
FIG. 6 is a longitudinal sectional view showing the constitution of the spindle unit 200 in an unclamped state.
Figure 7:
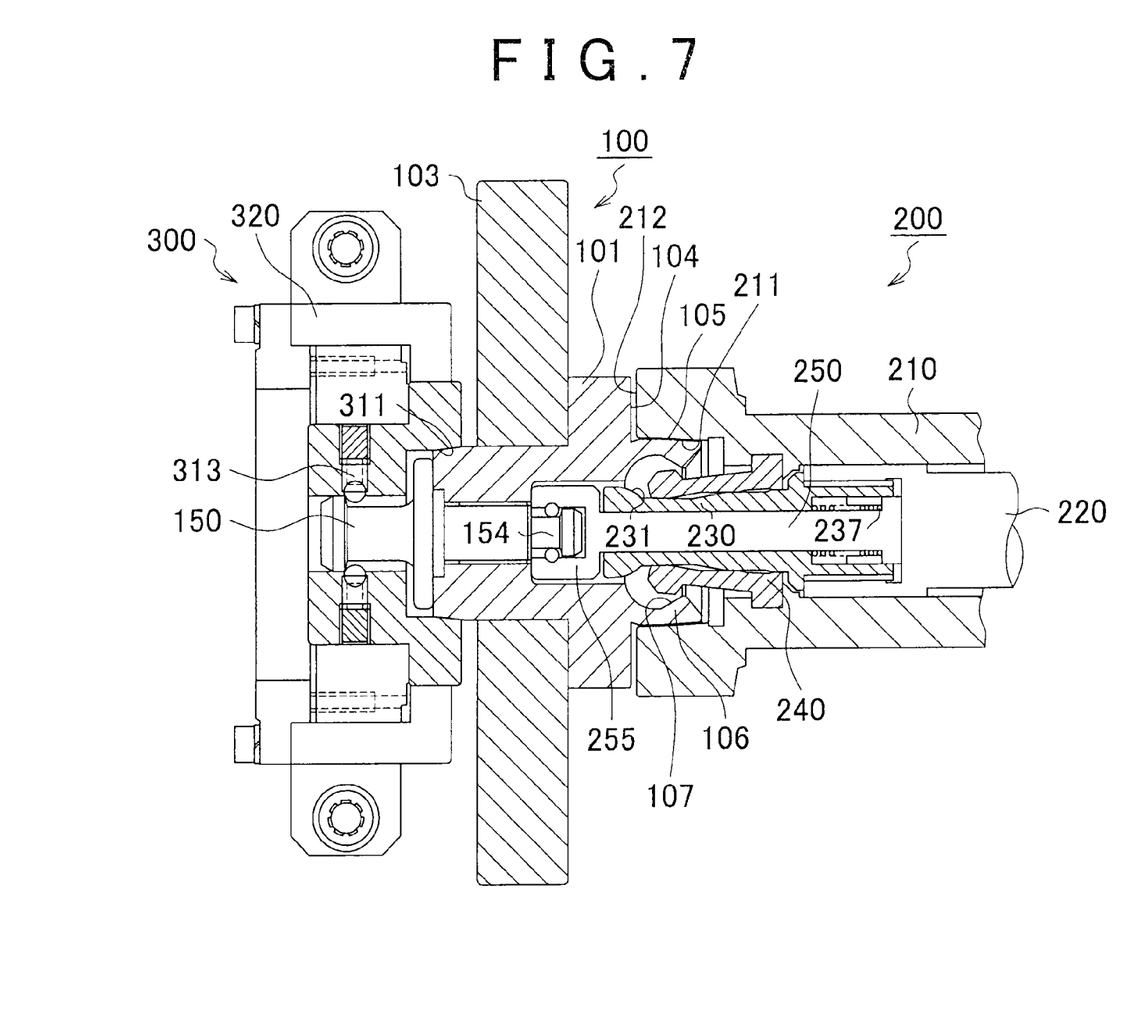
FIG. 7 is a longitudinal sectional view showing a state in which the tool 100, the spindle unit 200, and the tool retainer 300 are disposed in an unclamped state.
Figure 8:
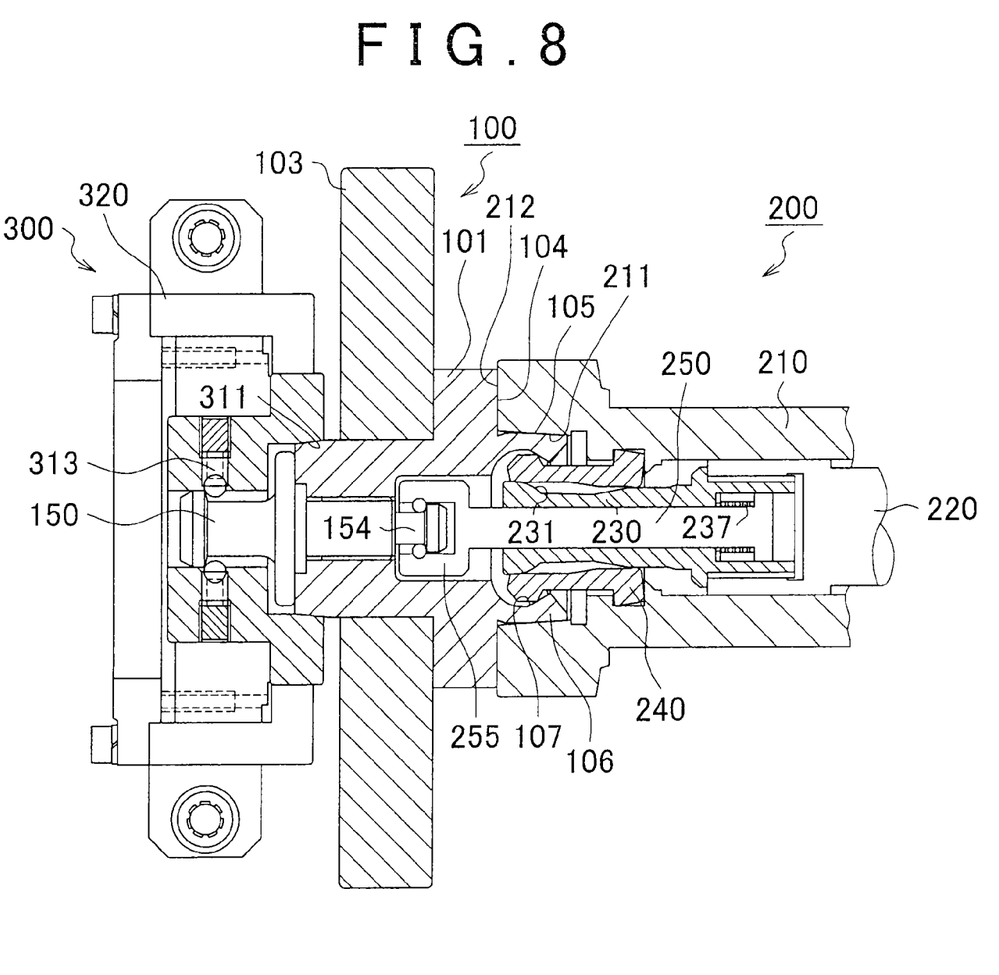
FIG. 8 is a longitudinal sectional view showing a state in which the tool 100, spindle unit 200, and tool retainer 300 are disposed in a clamped state.

FIG. 5 shows the structure of a tool according to a second embodiment of the invention. FIG. 6 is a longitudinal sectional view showing the constitution of the spindle unit 200 in an unclamped state. FIG. 7 is a longitudinal sectional view showing a state in which the tool 100, the spindle unit 200, and the tool retainer 300 are disposed in an unclamped state. FIG. 8 is a longitudinal sectional view showing a state in which the tool 100, spindle unit 200, and tool retainer 300 are disposed in a clamped state.

A tool clamping device according to the second embodiment of the invention differs from the first embodiment of the invention in the pull-in constitution by which the tool end surface 104 is brought into close contact with the spindle end surface 212, but is identical to the first embodiment in all other constitutions, and therefore only this difference will be described below.

(Tool 100) The tool 100 is mainly constituted by the tool holder 101, a pull stud bolt 150, and the tool main body portion 103.

The pull stud bolt 150 is attached to the tool holder 101 by screwing a screw portion 151 until a collar portion 152 contacts the tool holder 101. In this state, a latch portion 153 projects in an upright fashion from the tool retainer 300 side of the tool holder 101, similarly to the first embodiment, and a latch portion 154 also projects in an upright fashion from the spindle unit 200 side of the tool holder 101. All other constitutions are identical to the first embodiment.

(Spindle unit 200) The spindle unit 200 is mainly constituted by the spindle 210, the draw bar 220, the cone 230, the clamping wing 240, and a center rod 250. The spindle unit 200 is driven to rotate by a rotary driving device such as a motor or an air spindle, not shown in the drawings.

The cone 230 is screwed fixedly to the draw bar 220 by a screw portion 235, and the center rod 250 penetrates a hollow portion 236 of the cone 230 slidably. The center rod 250 is biased by a coil spring 237 in a direction for causing the center rod 250 to project to the tool 100 side. Further, a ball plunger portion 255 is formed on a tip end portion of the center rod 250. A hollow portion 256 for housing the latch portion 154 of the pull stud bolt 150 is formed in the ball plunger portion 255, and a ball 257 biased inward in the radial direction by a spring, not shown in the drawing, is disposed in the hollow portion 256. With this constitution, when the latch portion 154 of the pull stud bolt 150 is inserted into the hollow portion 256 of the ball plunger portion 255, the ball plunger portion 255 and the pull stud bolt 150 are maintained in a latched state by a moderation mechanism formed from the biased ball 257 and the latch portion 154 until a predetermined tensile load acts thereon. All other constitutions are identical to the first embodiment.

(Unclamped state) As shown in FIG. 6, in the unclamped state, the draw bar 220 is moved to the tool 100 side and the cone 230 is moved to the tool 100 side together with the draw bar 220. Therefore, the tip end portion 241 of the clamping wing 240 does not ride onto the step portion 231 and the clamping wing 240 remains closed in the radial direction.

As shown in FIG. 7, when the draw bar 220 is in the unclamped position, first, the tool retainer 300 and the spindle 210 are caused to face and approach each other until the ball plunger portion 255 is latched to the latch portion 154 of the pull stud bolt 150. The pull stud bolt 150 is then latched by the click portion 313 of the tool retainer 300 such that the tool 100 is held by the tool retainer 300 in a state where the tool holder 101 is positioned through contact with the taper portion 311. In this state, a gap is formed between the tool end surface 104 and the spindle end surface 212.

(Clamping operation) The draw bar 220 is withdrawn by pull-in force, whereby the pull stud bolt 150 is pulled in by a restoring force of the coil spring 237 provided on a rear portion of the center rod 250. Thus, the tool end surface 104 and the spindle end surface 212 come into close contact, thereby achieving end surface positioning and realizing inclination precision (the pull-in start step). When the pull-in start step is complete, the tool end surface 104 and the spindle end surface 212 are in close contact but a gap exists between the tool taper portion 105 and the spindle taper portion 211, and therefore a loose fit of ϕ0.001 to ϕ0.006 mm, for example, is achieved.

Following the pull-in start step, the draw bar 220 is withdrawn further by the pull-in force, and at the same time, the clamping wing 240, which has been pushed out along the step portion 231 of the cone 230, comes into contact with the clamping force acting portion 107. The taper shank portion 106 is increased in diameter by the outward radial component force (radially outward jutting force) of the clamping force generated by this contact. Thus, the tool taper portion 105 is deformed so as to come into close contact with the spindle taper portion 211, whereby tapered surface positioning is realized and centering precision is achieved. Further, a predetermined amount of end surface contact force is generated by the axial direction component force of the clamping force, thereby increasing the close contact between the tool end surface 104 and the spindle end surface 212 (the pull-in operation step). When the pull-in operation step is complete, the state shown in FIG. 8 is realized. Note that the direction of the clamping force is substantially 60°, as in the first embodiment.

By performing the pull-in start step and the pull-in operation step described above, a clamping operation for clamping the tool 100 to the spindle 210 through two-face restraint can be realized. Note that once the clamping operation is complete, the tool 100 is removed from the tool retainer 300 against the clicking force of the click portion 313 so that a processing operation can be performed.

(Unclamping operation) The unclamping operation is performed by reversing the clamping operation described above. More specifically, the spindle 210 clamping the tool 100 is caused to approach the tool retainer 300 such that the pull stud bolt 150 of the tool holder 101 is latched to the click portion 313 of the tool retainer 300. In this state, the draw bar 220 and cone 230 are moved toward the tool 100 side such that the ball plunger portion 255 is removed from the latch portion 154 of the pull stud bolt 150, and then moved further such that the clamping wing 240, which is pushed outward in the radial direction by the step portion 231 of the cone 230, is closed inward in the radial direction. As a result, the clamping force applied to the clamping force acting portion 107 of the tool holder 101 by the clamping wing 240 is released. Then, when the spindle 210 (the spindle unit 200) is removed from the tool retainer 300, the tool 100 remains held by the tool retainer 300, enabling an operation to replace the tool 100 with another tool or the like.

Effects of the Second Embodiment of the Invention

According to the second embodiment of the invention, in addition to the effects of the first embodiment, the tool end surface 104 and the spindle end surface 212 are brought into close contact using the engagement between the ball plunger portion 255 and the latch portion 154 of the pull stud bolt 150, and therefore the pull-in operation of the pull-in start step is performed reliably, leading to an improvement in the inclination precision obtained through end surface positioning.

The tool clamping device and tool clamping method according to the invention were described above on the basis of the above embodiments, but the invention is not limited to these embodiments, and may be implemented in various other embodiments within a scope that does not depart from the spirit thereof.

What is claimed is:
1. A tool clamping device comprising:
 a tool holder having a two-face restraint portion constituted by a tool taper portion and a tool end surface;
 a spindle having a spindle taper portion facing the tool taper portion and a spindle end surface facing the tool end surface, wherein the tool holder is clamped to the spindle by performing an operation to pull the tool holder in toward the spindle; and
 a clamping unit housed in the spindle,
 wherein when the tool end surface is in contact with the spindle end surface and the tool taper portion is fitted into the spindle taper portion, a gap is formed between the tool taper portion and the spindle taper portion.
2. The tool clamping device according to claim 1, wherein, when a pull-in operation performed by the clamping unit begins, a gap is formed between the tool taper portion and the spindle taper portion, and when the pull-in operation ends, the tool taper portion and the spindle taper portion are in close contact.
3. The tool clamping device according to claim 1, wherein the tool holder comprises a taper shank portion having a hollow shape, and the tool taper portion is an outer peripheral surface of the taper shank portion.

4. The tool clamping device according to claim 3, wherein the taper shank portion comprises a clamping force acting portion that receives a radially outward clamping force generated during the pull-in operation performed by the clamping unit.

5. The tool clamping device according to claim 4, wherein the clamping force acting portion is an inclined surface for converting the clamping force into components in both an outward radial direction of the spindle and a direction, of an axial direction of the spindle, in which the tool end surface and the spindle end surface come into close contact.

6. The tool clamping device according to claim 5, wherein the clamping unit comprises a draw bar for performing the pull-in operation, a cone fixed to the draw bar, and a clamping wing disposed on an outer peripheral surface of the cone.

7. The tool clamping device according to claim 6, wherein a step portion is provided on the outer peripheral surface of the cone, the step portion increases a diameter of the clamping wing outward in the radial direction during the pull-in operation of the draw bar, and when the diameter of the clamping wing is increased, a tip end portion of the clamping wing applies the darning force to the inclined surface.

8. A tool clamping method comprising:

a pull-in start process of causing a tool holder having a two-face restraint portion constituted by a tool taper portion and a tool end surface to face a spindle having a spindle taper portion facing the tool taper portion and a spindle end surface facing the tool end surface such that the tool end surface and the spindle end surface are brought into contact with each other; and a pull-in operation process of, after the pull-in start process, increasing a diameter of the tool taper portion such that the tool taper portion is brought into close contact with the spindle taper portion, wherein in the pull-in start process when the tool end surface is in contact with the spindle end surface, a gap is formed between the tool taper portion and the spindle taper portion.

9. The tool clamping method according to claim 8, wherein in the pull-in operation process, the diameter of the tool taper portion is increased such that the tool taper portion is brought into close contact with the spindle taper portion, and by increasing the diameter of the tool taper portion, the tool taper portion is brought into close contact with the spindle taper portion.

10. The tool clamping device according to claim 3, wherein the tool taper portion is a continuous outer peripheral surface of the taper shank portion.

11. The tool clamping device according to claim 4, wherein the taper shank portion includes a continuous inner surface having the clamping force acting portion that receives the radially outward clamping force.

* * * * *